No. 894,226. PATENTED JULY 28, 1908.
E. PALMER.
REPLANTING ATTACHMENT FOR CULTIVATORS.
APPLICATION FILED APR. 30, 1908.
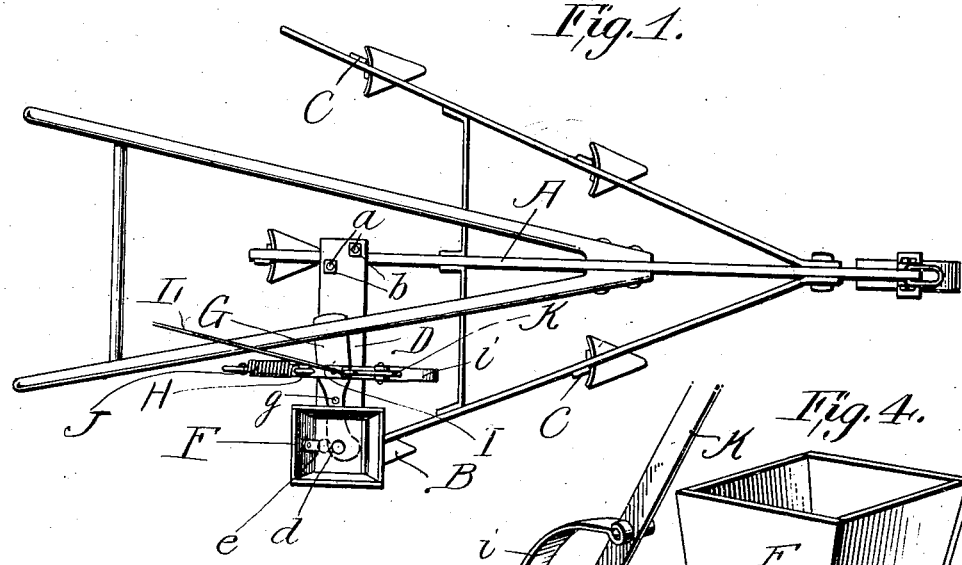
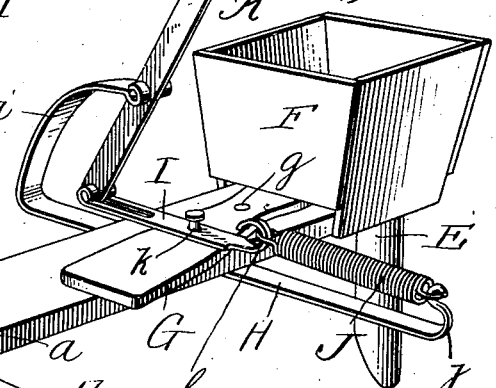
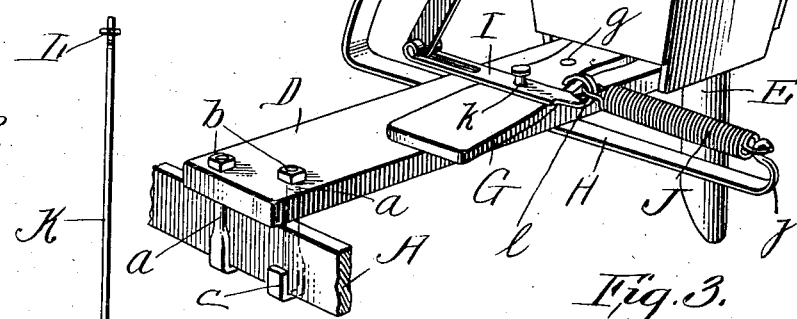
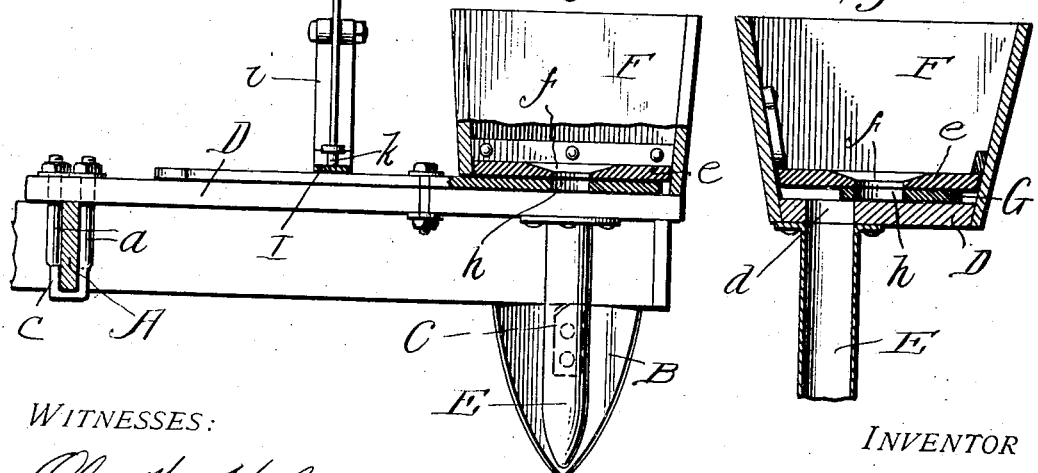
WITNESSES: INVENTOR
Emory Palmer,
BY James J Sheehy
Attorney

UNITED STATES PATENT OFFICE.

EMORY PALMER, OF KENT ISLAND, MARYLAND.

REPLANTING ATTACHMENT FOR CULTIVATORS.

No. 894,226.  Specification of Letters Patent.  Patented July 28, 1908.

Application filed April 30, 1908. Serial No. 430,105.

*To all whom it may concern:*

Be it known that I, EMORY PALMER, citizen of the United States, residing at Kent Island, in the county of Queen Anne and State of Maryland, have invented new and useful Improvements in Replanting Attachments for Cultivators, of which the following is a specification.

My invention pertains to seed planters of the walking type; and it has for one of its objects to provide simple and efficient means for effecting what is known as "replanting," the said means being under the control of an operator and being adapted to withstand the rough usage to which such mechanism is ordinarily subjected.

Another object of the invention is to provide improved replanting means constructed with a view of being readily attached to and used upon cultivators of the kinds at present in general use.

With the foregoing in mind, the novelty, utility and practical advantages of my invention will be fully understood from the following description and claim when the same are read in connection with the drawings, accompanying and forming part of this specification, in which:

Figure 1 is a view illustrating a portion of a cultivator and my improved replanting means properly positioned thereon. Fig. 2 is a view on an enlarged scale illustrating the manner in which the body of the replating means is connected to one of the frame bars of the cultivator. Fig. 3 is a detail sectional view taken through the seed hopper and the means for effecting the discharge of seed therefrom. Fig. 4 is a view showing the relative arrangement of the body, the oscillating seed-discharging plate, the means through which said plate is swung in opposite directions, and the supporting bar for said means.

Similar letters designate corresponding parts in all of the views of the drawings, referring to which:

A is a frame bar of a cultivator.

B is a shovel, and C is a shovel-standard through which the shovel is connected with the frame bar, preferably in the ordinary, well known manner.

As before stated, I prefer to embody my improvements in an attachment readily applicable to cultivators such as at present in use, and to this end I arrange all of the parts of the improvements on a body D. The said body D is connected to the frame bar A in the manner best shown in Fig. 2—that is to say, through the medium of bolts $a$ which extend through the body D and are equipped above the body with nuts $b$ and below the body with oppositely disposed hooks $c$ which snugly receive the frame bar A. By virtue of this construction it will be manifest that the body D may be expeditiously and easily fastened to and as readily detached from the frame bar A, and yet there is no liability of the body being casually disconnected during the use of the cultivator and my improvements.

The body D is provided adjacent to its outer end with a vertically disposed aperture $d$, and connected to and depending from the said body is a seed-tube E which depends to a point behind the before mentioned shovel B.

In addition to the body D and the seed-tube E, my improvements comprise a seed hopper F fixed to the body and having its bottom $e$ disposed a slight distance above the upper side of the body and also having an aperture $f$ in said bottom arranged forward of and consequently out of alinement with the aperture $d$ in the body, an oscillating seed-discharging plate G fulcrumed at $g$ on the body D and having its outer arm interposed between the body D and the bottom $e$ of the hopper, and also having an aperture $h$ in said outer arm which normally registers with the aperture $f$ in the hopper bottom, a supporting bar H, preferably of wrought iron, fixed to the under side of and disposed at a right angle to the body D and having a rearwardly extending overhanging arm $i$ at its forward end and a hook $j$ at its rear end, a link I, pivoted at $k$ on the inner arm of the plate G so as to swing horizontally and having a hook $l$ at its rear end, a tractile spring J interposed between the hook $j$ of the supporting bar H and the hook $l$ of the link I, a vertically swinging lever K fulcrumed at an intermediate point of its length on the overhanging arm $i$ of the supporting bar H and having its lower arm connected to the forward end of the link I, and a rod L connected to the upper arm of the lever K and designed to extend rearwardly to a point within convenient reach of the operator of the walking cultivator.

As will be readily understood from the foregoing, the spring J serves to return the plate I to and normally retain the same in the position illustrated, and consequently it will be manifest that while seed may pass through the aperture f in the bottom of the hopper into the aperture h in the outer arm of the plate G, such seed will be prevented by the body D from leaving the said aperture h in the plate. It will also be manifest that when the upper arm of the lever K is moved rearward, the plate G will be swung, against the action of the spring J, so as to carry the aperture h in the plate out of register with the aperture f in the hopper bottom and into register with the aperture d in the body D, whereupon the seed contained in the said aperture h of the plate will be discharged through the tube E to the ground at a point behind the shovel B. On the said movement of the plate G its portion in front of the aperture h will prevent the discharge of seed through the aperture f, but after the parts are returned to their normal positions by contraction of the spring J, the aperture h in the plate G will again receive seed from the aperture f in the hopper bottom.

My novel replanting means is designed particularly for use on cultivators employed in working corn, and when my improvements are used on a cultivator so employed, the operator watches the hills and when he comes to a hill that is empty or devoid of corn he manipulates the plate G through the medium of the rod L, the lever K and the link I so as to effect the deposit of seed in said hill.

In addition to the practical advantages hereinbefore ascribed to my improvements, it will be noted that the improvements are reliable in operation and are well adapted to withstand the rough usage to which such mechanism is ordinarily subjected, and this without being made unduly heavy.

Having described my invention, what I claim and desire to secure by Letters-Patent, is:

The herein described replanting attachment for cultivators, comprising a body adapted to be fixed with respect to the frame of a cultivator, a seed hopper carried by the body and having a discharge aperture in its bottom and a seed-tube communicating with said aperture and depending from said bottom, a plate pivoted at an intermediate point of its length on the body and arranged to control the passage of seed from the discharge aperture of the hopper, a supporting bar fixed to the under side of the body and extending fore and aft from the same and having a hook at its rear end, and also having an arm extending upwardly and rearwardly from its forward end, a link pivoted at an intermediate point of its length on the inner arm of the plate and having a hook at its rear end, a tractile spring connecting the said hook of the link and the hook on the rear end of the supporting bar, and a lever fulcrumed at an intermediate point of its length on the said upwardly and rearwardly extending arm of the supporting bar and pivotally connected at its lower end to the forward end of the said link.

In testimony whereof I have hereunto set my hand in presence of two subscribing witnesses.

EMORY PALMER.

Witnesses:
H. A. PALMER,
G. O. COLLAWAY.